US011184045B1

(12) United States Patent
Briancon et al.

(10) Patent No.: US 11,184,045 B1
(45) Date of Patent: Nov. 23, 2021

(54) DENSITY FUNCTION CENTRIC SIGNAL PROCESSING

(71) Applicant: Alarm.com Incorporated, Tysons, VA (US)

(72) Inventors: Alain Charles Briancon, Poolesville, MD (US); Marc Anthony Epard, Lawrence, KS (US); Robert Leon Lutes, Lawrence, KS (US); John Berns Lancaster, Lawrence, KS (US); Jerald Frederic Johnson, Lawrence, KS (US); Ronald Byron Kabler, Roselle, IL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/853,028

(22) Filed: Apr. 20, 2020

Related U.S. Application Data

(62) Division of application No. 15/712,768, filed on Sep. 22, 2017, which is a division of application No. 14/085,898, filed on Nov. 21, 2013, now Pat. No. 9,787,341.

(60) Provisional application No. 61/729,112, filed on Nov. 21, 2012.

(51) Int. Cl.
*H04B 1/30* (2006.01)

(52) U.S. Cl.
CPC ......... *H04B 1/30* (2013.01); *H04B 2001/305* (2013.01)

(58) Field of Classification Search
CPC .................. H04B 1/30; H04B 2001/305
See application file for complete search history.

(56) References Cited

U.S. PATENT DOCUMENTS

| 4,411,021 | A  | 10/1983 | Yoakum |
| 6,445,736 | B1 | 9/2002  | Wheeler |
| 6,466,614 | B1 | 10/2002 | Smith |
| 6,512,854 | B1 | 1/2003  | Mucci et al. |
| 6,535,641 | B1 | 3/2003  | Baggenstoss |
| 6,882,208 | B1 | 4/2005  | Suissa et al. |
| 7,107,306 | B2 | 9/2006  | Nikitin |
| 7,330,801 | B2 | 2/2008  | Goldberg et al. |

(Continued)

OTHER PUBLICATIONS

"Capacity of a Burst-Noise Channel," by: E.N. Gilbert; (Manuscript received Mar. 15, 1960) pp. 1253-1265.

(Continued)

*Primary Examiner* — Manuel L Barbee
(74) *Attorney, Agent, or Firm* — Fish & Richardson P.C.

(57) ABSTRACT

A circuit for direct current (DC) offset estimation comprises a quantile value circuit and a signal processor. The quantile value circuit determines a plurality of quantile values of an input signal and includes a plurality of quantile filters. Each quantile filter includes a comparator, a level shifter, a monotonic transfer function component, and a latched integrator. The comparator compares the input signal and a quantile value. The level shifter shifts the output of the comparator. The monotonic transfer function component determines the magnitude of the shifted signal and provide a transfer function signal. The latched integrator suppresses transient characteristics of the transfer function signal and provide the quantile value. The signal processor is configured to calculate a weighted average of the quantile values to yield a DC offset estimate.

14 Claims, 8 Drawing Sheets

(56) References Cited

U.S. PATENT DOCUMENTS

| | | |
|---|---|---|
| 7,353,010 B1 | 4/2008 | Zhang et al. |
| 7,408,508 B2 | 8/2008 | Goldberg |
| 7,617,270 B2 | 11/2009 | Nikitin |
| 7,971,131 B1 * | 6/2011 | Ordentilch ......... H03M 13/6511 |
| | | 714/786 |
| 2003/0088542 A1 | 5/2003 | McGee |
| 2007/0082643 A1 | 4/2007 | Golusky |
| 2009/0037795 A1 * | 2/2009 | Verdu ............... H03M 13/6577 |
| | | 714/780 |
| 2011/0112784 A1 | 5/2011 | Nikitin |

OTHER PUBLICATIONS

"Handbook on Statistical Distributions for experimentalists," By: Christian Walck; Internal Report SUF-PFY/96/01 Stockholm, Dec. 11, 1996; 1st revision, Oct. 31, 1998; last modification Sep. 10, 2007; Particle Physics Group Fysikum University of Stockholm.

"Finite-state Markov model for Rayleigh fading channels," by: Q. Zhang Ands.A. Kassam; IEEE Trans. Commun. vol. 47, pp. 1688-1692.

"Probability, Random Variables, and Random Signal Principles," By: P.Z. Peebles Jr.; 4th Ed. McGraw Hill, 2000. (see "Power Line Communications: Theory and Applications for Narrowband and Broadband Communications over Power Lines," By: H.C. Ferreira et al.; Wiley; 2010).

* cited by examiner

DENSITY FUNCTION CENTRIC SIGNAL PROCESSING

RELATED APPLICATIONS

This application is a divisional of application Ser. No. 15/712,768, filed Sep. 22, 2017, now allowed, which is a divisional of application Ser. No. 14/085,898, filed Nov. 21, 2013, now U.S. Pat. No. 9,787,341, issued Oct. 10, 2017, which claims the benefit of U.S. provisional patent application titled "Density Function Centric Signal Processing", U.S. Application Ser. No. 61/729,112, filed Nov. 21, 2012. All of these prior applications are incorporated by reference in their entirety.

BACKGROUND OF THE INVENTION

Field of the Invention

Embodiments of the current invention relate to methods and systems of communication that utilize statistical probability functions to perform signal processing.

Description of the Related Art

Communications systems allow data, audio, and video to be transmitted from one point to another through links implemented in terrestrial, cellular, satellite, and storage systems. Each link may include a signal transmitter, a noise component, a channel, and a signal receiver. The signal transmitter may encode and/or modulate data bits into a signal before transmitting the signal along the channel. The receiver may receive the signal and attempt to demodulate and decode it in order to recover the original data. Noise can affect the signal at the transmitter, on the channel, at the receiver, or all three. The performance of the receiver is particularly sensitive to noise as it may not recover the original data accurately if the noise cannot be properly detected and mitigated. Prior art receiver designs include schemes to detect and mitigate noise. However, the receivers have difficulties dealing with noise when the noise varies with time, is impulsive, or is non-Gaussian in nature.

SUMMARY OF THE INVENTION

Embodiments of the current invention solve the above-mentioned problems and provide a distinct advance in the art of communications systems. More particularly, embodiments of the invention provide methods and circuits that improve the performance of communications systems that are subject to time-varying noise.

A first embodiment of the invention provides a circuit for direct current (DC) offset estimation. The circuit comprises a quantile value circuit and a signal processor. The quantile value circuit determines a plurality of quantile values of an input signal and includes a plurality of quantile filters. Each quantile filter includes a comparator, a level shifter, a monotonic transfer function component, and a latched integrator. The comparator compares the input signal and a quantile value. The level shifter shifts the output of the comparator. The monotonic transfer function component determines the magnitude of the shifted signal and provide a transfer function signal. The latched integrator suppresses transient characteristics of the transfer function signal and provide the quantile value. The signal processor is configured to calculate a weighted average of the quantile values to yield a DC offset estimate.

A second embodiment of the invention provides a circuit for fine DC offset estimation. The circuit comprises a DC offset estimation circuit, an adaptive prescaler, and a selector circuit. The DC offset estimation circuit provides a DC offset estimate of an input signal and may include the circuit of the first embodiment of the current invention. The adaptive prescaler scales the DC offset estimate signal in order to provide a scaled signal. The selector circuit receives the input signal and the scaled signal and provides the scaled signal to the DC offset estimation circuit in order for the DC offset estimation circuit to perform a fine DC offset estimation of the scaled signal.

A third embodiment of the invention provides a decoder apparatus for receiving a signal from a channel medium. The decoder apparatus comprises a noise detector and a decoder. The noise detector receives a signal from a channel density function estimation circuit, wherein the noise detector estimates a signal density function, maps the density function in one or more density function bit samples, and appends a density function bit reliability measure to each bit sample. The decoder determines logic states of the appended density function bit reliability measure and detected bits in the signal and applies the density function bit reliability measures of detected bits to generate data bits.

A fourth embodiment of the invention provides an apparatus for classifying a signal as one of noise and a predetermined type of event comprising a plurality of symbols subjected to predetermined channel noise regimes, each regime represented by one or more of a plurality of temporal attributes. The apparatus comprises a receiver and a signal processor. The receiver estimates a density function of the signal and samples the density function at a plurality of points. The signal processor is connected to the receiver and configured to determine a maximum number of the regimes and a minimum number of the regimes through a clustering technique, initialize a plurality of clusters corresponding to the plurality of sampled points, based upon the maximum and minimum numbers, process, through a clustering technique, a signal value corresponding to each of the regimes by updating parameters maintained for a cluster of the plurality of clusters, calculate a plurality of statistical values from the updated parameters, and classify the signal based upon the plurality of statistical values and the updated parameters.

A fifth embodiment of the invention provides a method of DC voltage offset estimation for a DC estimation circuit receiving an input signal. The method comprises the steps of: determining a plurality of quantile values of the input signal, calculating a weighted average of the quantile values, compensating the input signal using the weighted average, and scaling the compensated input signal.

A sixth embodiment of the invention provides a method of processing a noise signal with functions including automatic squelch, automatic gain control (AGC), equalization, and dynamic range control (DRC). The method comprises the steps of: extracting a density function of the noise signal, extracting an attribute of the density function, producing a unidirectional density function signal level as a function of the attribute, storing the unidirectional density function signal level in response to a predetermined condition producing a density function stored signal level, extracting the density function of the noise signal after the unidirectional density function signal level is stored, extracting an attribute of the density function, producing a unidirectional density function signal level as a function of the attribute, comparing the most recently produced unidirectional signal level to the stored signal level, and generating a control signal when the unidirectional signal level is a function of the stored signal level.

A seventh embodiment of the invention provides a method of decoding a signal received from a channel. The method comprises the steps of: determining a density function of a received signal, determining a bias attribute based on the density function of the signal, determining a reliability bias for the bias attribute, applying the reliability bias to a reliability measure to estimate logic states of detected bits in the signal, and generating user bits as a function of the detected bits.

An eighth embodiment of the invention provides a method of classifying a signal as one of noise and a predetermined type of event comprising a plurality of symbols subjected to predetermined channel noise regimes, each regime represented by one or more of a plurality of temporal attributes. The method comprises the steps of: estimating a density function of the signal, sampling the density function at a plurality of points, determining a maximum number of the regimes and a minimum number of the regimes through a clustering technique, initializing a plurality of clusters corresponding to the sampled points, based upon the maximum and minimum numbers, processing, through a clustering technique, a signal value corresponding to each of the regimes by updating parameters maintained for a cluster, calculating a plurality of statistical values from the parameters maintained for the clusters, and classifying the signal based upon the plurality of statistical values and the parameters.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 12:
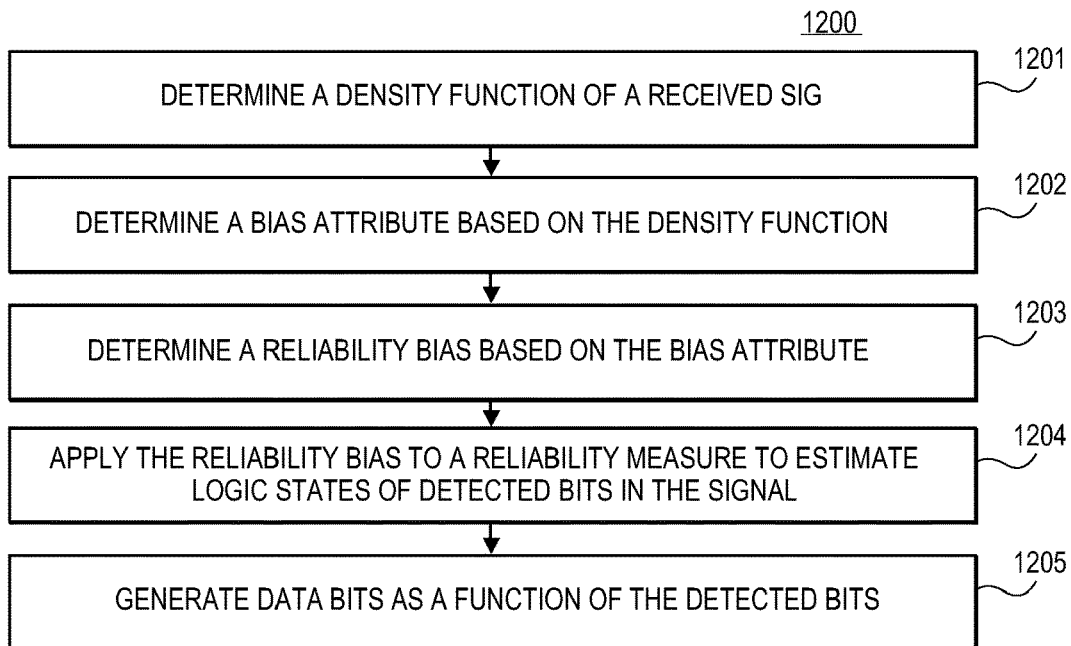
Figure 13:
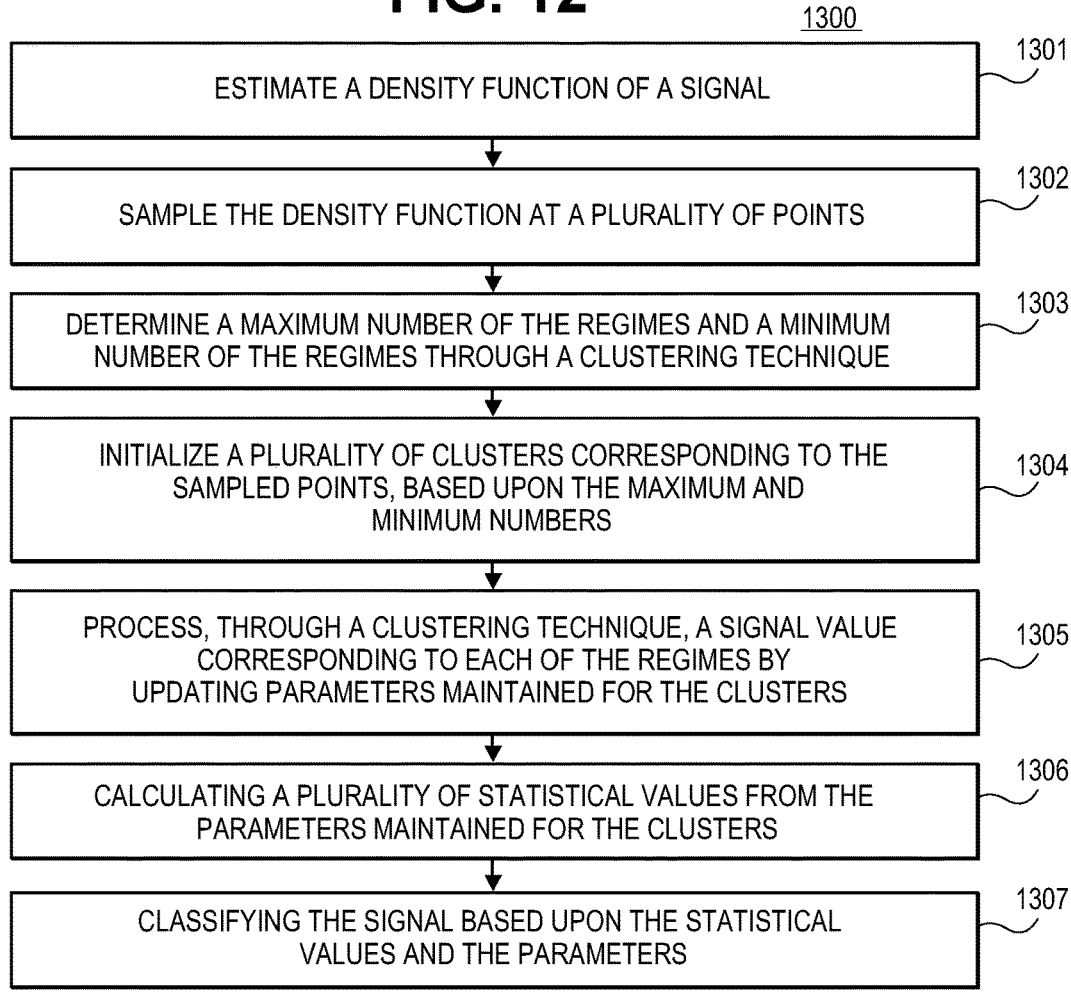

FIG. 12 is a flow diagram of at least a portion of the steps of a method of decoding a signal received from a channel in accordance with a seventh embodiment of the current invention; and FIG. 13 is a flow diagram of at least a portion of the steps of a method of classifying a signal as one of noise and a predetermined type of event comprising a plurality of symbols subjected to predetermined channel noise regimes, each regime represented by one or more of a plurality of temporal attributes in accordance with a eighth embodiment of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
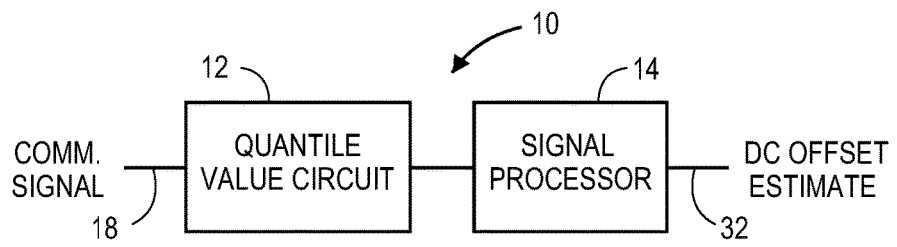
FIG. 1 is a schematic block diagram of a circuit for direct current (DC) offset estimation, constructed in accordance with a first embodiment of the current invention.

A circuit 10 for direct current (DC) offset estimation, constructed in accordance with a first embodiment of the current invention, is shown in FIG. 1, and may broadly comprise a quantile value circuit 12 and a signal processor 14. The circuit 10 may be utilized in a device that is part of a wired or wireless communications system, such as telephone, internet, and television services in a residence or business, satellite communications, cellular communications, wireless network communications, and the like. The device may be a component such as a cable or digital subscriber line (DSL) modem, a router, a handset, or the like that is subjected to noise or interference from any of a variety of sources. The device may also be a component of a sensor system, such as a voltage meter, a current meter, or a power meter. The circuit 10 may be specifically utilized with a receiver of the device that receives a communications signal. The signal typically is periodic and sinusoidal or square-wave in nature with high values and low values that represent data bits. The signal also has a DC level which represents a baseline or reference voltage such that the high and low values are evaluated with respect to the DC level. Normally, the DC level is constant. However, noise impinging on the signal may cause the DC level to vary—introducing a DC offset that affects and changes the high value, the low value, or both. Receivers may be sensitive to noise that creates the DC offset because even small values of DC offset can lead to errors in decoding the signal data. The DC offset may be corrected by other circuitry. In order for the other circuitry to correct the DC offset, an estimate of the offset must be supplied.

Figure 2:
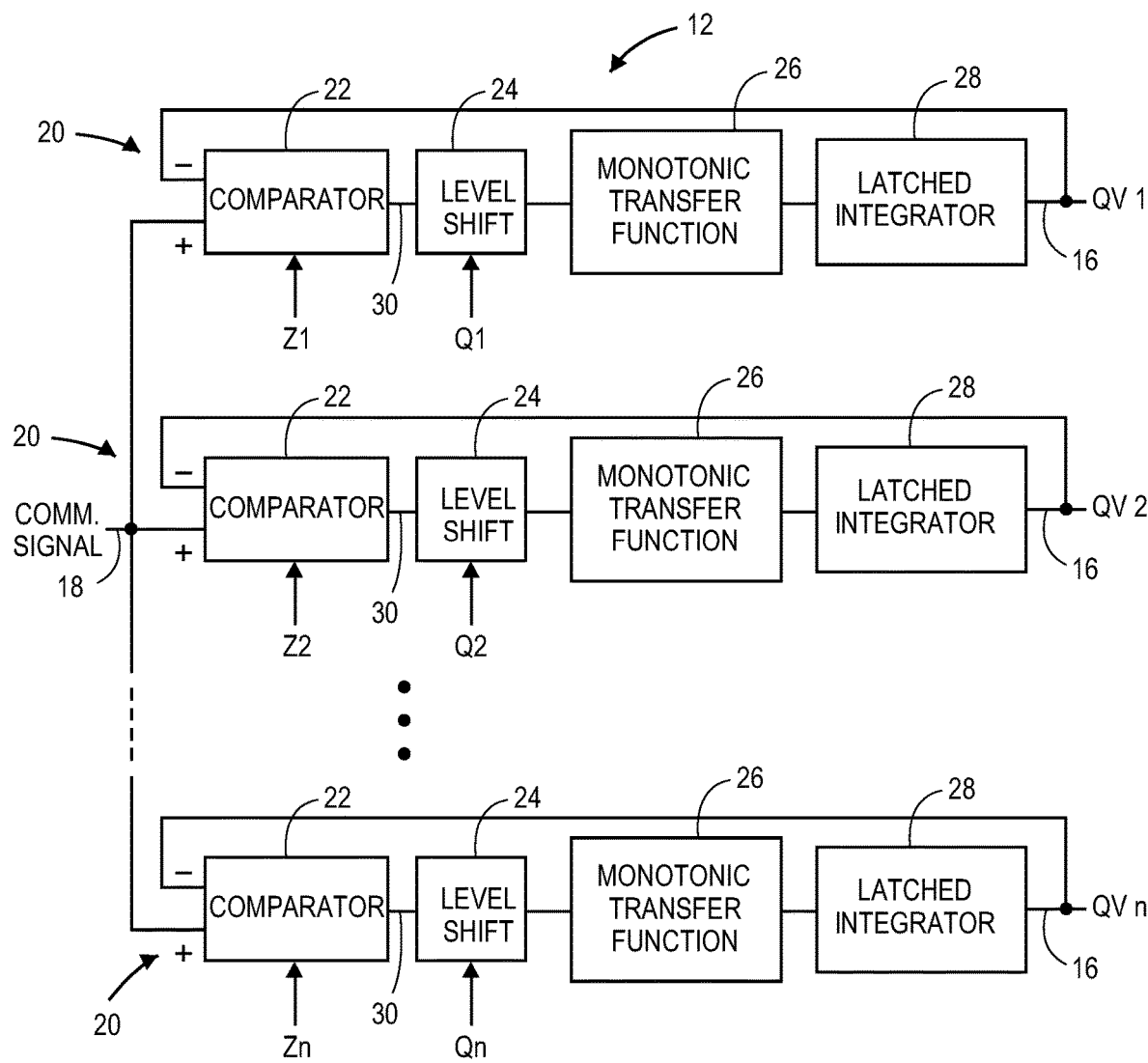
FIG. 2 is a schematic block diagram of a quantile value circuit utilized in the circuit of FIG. 1.
Figure 3:
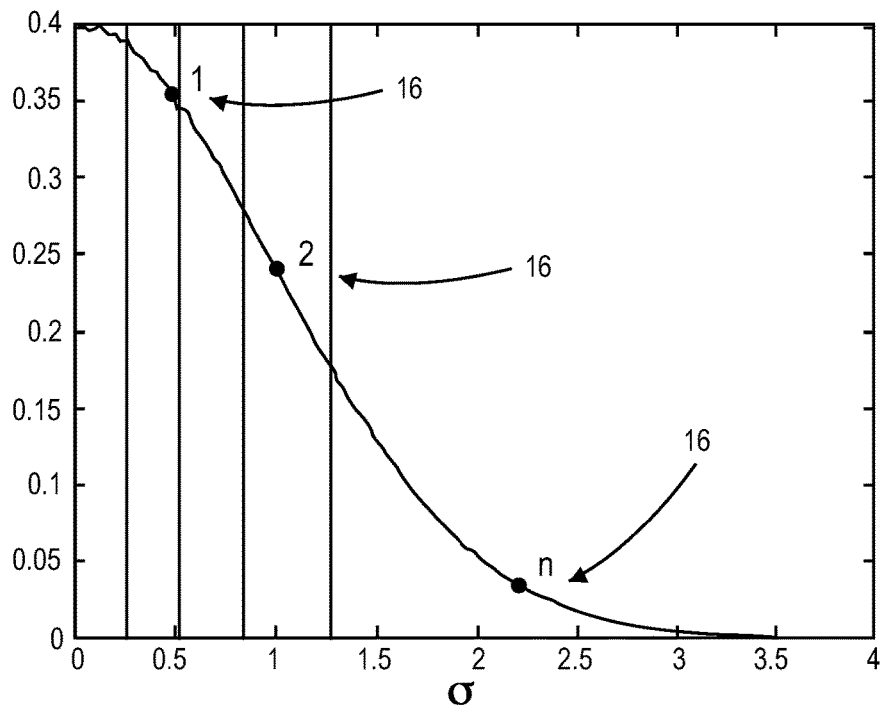
FIG. 3 is a plot of a probability density function (PDF) of an attribute of a communications signal.

The quantile value circuit 12, as shown in FIG. 2, generally determines a plurality of quantile values 16 of an input communications signal 18. The quantile value 16 is a value of a certain attribute of the signal such as the voltage, the current, the power, or the like. The probability that the value of the attribute of the signal is less than the quantile value 16 is inversely proportional to the number n of quantile values 16, as seen in FIG. 3, wherein a probability density function (PDF) of an attribute of the communications signal 18 is shown. Quantiles may also refer to points taken at regular interval from the cumulative distribution function (CDF) of a variable, such as the communications signal 18. Furthermore, a quantile set of points may divide an ordered distribution into parts, regardless of the proportion of outcomes in each part or their position on a grid. The quantile value circuit 12 may also perform any one of the following functions: multimodal pulse shaping, analog rank filtering, offset rank ordering, analog counting, clustering, singular value decomposition, principal component analysis, or independent component analysis. As seen in FIG. 2, the quantile value circuit 12 may include a plurality of quantile filters 20, wherein each quantile filter 20 includes a comparator 22, a level shifter 24, a monotonic transfer function component 26, and a latched integrator 28. Each quantile filter 20 may produce a quantile value 16.

The comparator 22 generally compares two signals and produces an output that is the difference between the two. The comparator 22 may include a positive input to which the communications signal 18 is connected and a negative input to which the quantile value 16 is connected. The comparator 22 may output a difference signal 30 corresponding to the communications signal 18 minus the quantile value 16. The comparator 22 may also receive an optional first control signal Z, which is generally a known reference signal from within the circuit 10 or generated external to the circuit 10. The first control signal Z may have a DC voltage or an alternating current (AC) voltage or may be periodic in nature with a constant or varying frequency or an arbitrary but known waveform. In addition, the first control signal Z may introduce control or timing parameters such as filtering the communications signal 18 over a certain time period or controlling the response time over which the comparator 22 functions. The comparator 22 may include analog active and/or passive electronic circuitry, such as operational amplifiers, filters, and the like, or combinations thereof.

The level shifter 24 generally shifts the level of a certain aspect of the difference signal 30 such as the voltage or the current. The level shifter 24 may include analog active and/or passive electronic circuitry, such as operational amplifiers, transistors, discrete components, and the like, or combinations thereof. In some embodiments, the level shifter 24 may further include signal mixer components which may change or shift the frequency of the difference signal 30. The level shifter 24 may also receive an optional second control signal Q, with similar features to the first control signal Z.

The monotonic transfer function component 26 generally produces a magnitude or norm of a signal by applying a monotonic transfer function such as an exponential function or a logarithmic function that may have a filtering effect. The monotonic transfer function component 26 may include analog active and/or passive electronic circuitry. The monotonic transfer function component 26 may receive a signal from the level shifter 24.

The latched integrator 28 generally reduces the amplitude of transient characteristics of the signal from the monotonic transfer function component 26. The latched integrator 28 may control the rate at which the signal from the monotonic transfer function component 26 is tracked. The latched integrator 28 may also receive, or be configured with, timing information regarding the structure of the packets or payloads of the communications signal 18. Each packet may include a header portion and a data portion. The function of the latched integrator 28 may change depending on the portion of the packet being processed. For example, the latched integrator 28 may provide greater suppression of the transient characteristics during the data portion of the packet than during the header portion of the packet. The latched integrator 28 may include analog active and/or passive electronic circuitry that performs an integrating function. The latched integrator 28 produces the quantile value 16, which is fed back to the comparator 22.

The signal processor 14 generally calculates a weighted average of the quantile values to yield a DC offset estimate 32 and may include processors, microprocessors, microcontrollers, digital signal processors (DSPs), field-programmable gate arrays (FPGAs), analog and/or digital application-specific integrated circuits (ASICs), or the like, or combinations thereof. The signal processor 14 may generally execute, process, or run instructions, code, code segments, software, firmware, programs, applications, apps, processes, services, daemons, or the like, or may step through states of a finite-state machine. The signal processor 14 may receive all of the quantile values 16 from the quantile value circuit 10 and may determine the average of the quantile values 16 by weighting some of the values according to the probability density function, the cumulative distribution function, other density function, or other mathematical function in order to output an estimate of the DC offset of a certain attribute of the communications signal 18.

Figure 4:
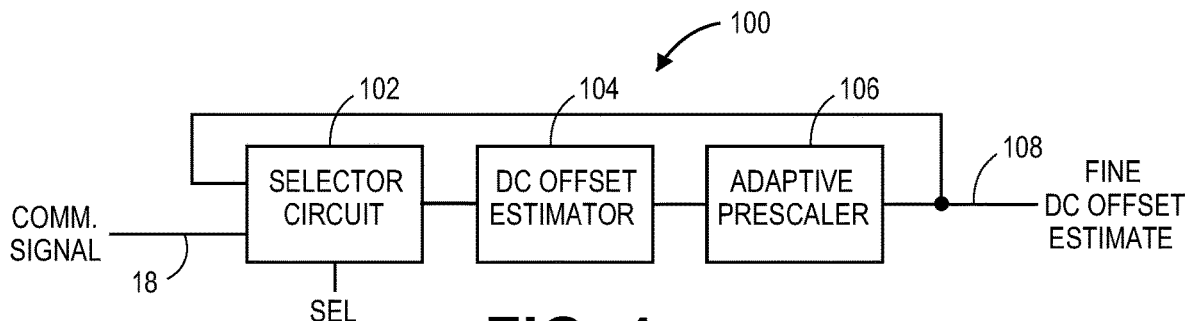
FIG. 4 is a schematic block diagram of a circuit for fine DC offset estimation, constructed in accordance with a second embodiment of the current invention.

A circuit 100 for fine DC offset estimation, constructed in accordance with a second embodiment of the current invention, is shown in FIG. 4, and may broadly comprise a selector circuit 102, a DC offset estimator 104, and an adaptive prescaler 106. The circuit 100 may receive the communications signal 18 and may output a fine DC offset estimate 108. The circuit 100 may be utilized in the same fashion as the circuit 10 and may perform a similar function, except that the fine DC offset estimate 108 may provide a higher resolution than the DC offset estimate 32.

The selector circuit 102 generally selects one of two or more signals to pass through to its output. The selector circuit 102 may receive the communications signal 18 at a first input and the fine DC offset estimate 108 at a second input. The selector circuit 102 may output either the communications signal 18 or the fine DC offset estimate 108 depending on the state of a select line 110, which may have a binary value to select either the first or the second input. The selector circuit 102 may include multiplexing components, switching components, operational amplifiers, discrete components, or the like, or combinations thereof.

The DC offset estimator 104 generally provides an estimate of the DC offset of a certain attribute of the output of the selector circuit 102, which is either the communications signal 18 or the fine DC offset estimate 108. The DC offset estimator 104 has substantially the same structure and functions in substantially the same manner as the circuit 10, discussed above.

The adaptive prescaler 106 generally scales the frequency of the signal from the DC offset estimator 104. The adaptive prescaler 106 may include counters, filters, operational amplifiers, discrete components, or the like, or combinations thereof. The adaptive prescaler 106 may receive the signal from the DC offset estimator 104 and may reduce the frequency of the signal by an integer factor in order to output the fine DC offset estimate 108.

Figure 5:
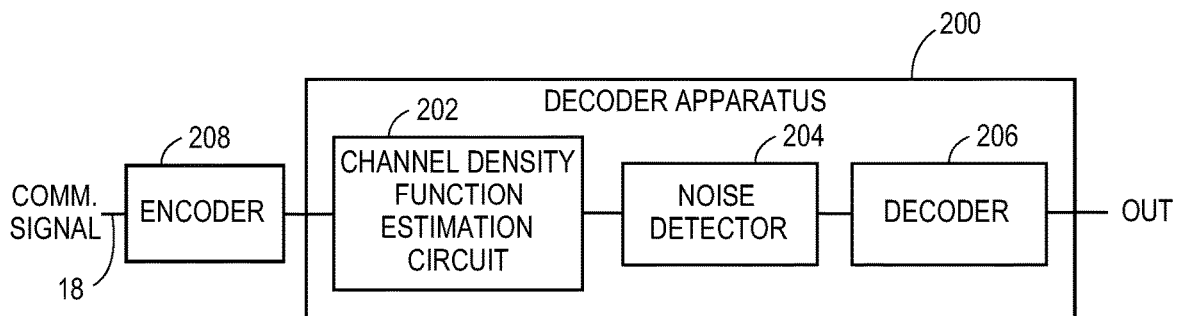
FIG. 5 is a schematic block diagram of a decoder apparatus, constructed in accordance with a third embodiment of the current invention.

A decoder apparatus 200, constructed in accordance with a third embodiment of the current invention, is shown in FIG. 5, and may broadly comprise a channel density function estimation circuit 202, a noise detector 204, and a decoder 206. The decoder apparatus 200 may be utilized in a communication system when receiving a signal on a channel that has already been encoded by an encoder 208 with a symbol-based encoding or modulation scheme, such as frequency or phase shift keying, quadrature amplitude modulation, or the like. The system may also utilize forward error correction schemes, such as turbo codes or low-density parity-check codes, which take probabilities as inputs rather than bits. Thus, instead of zeros and ones, the input is the likelihood each bit is a zero or a one. A decoder typically uses iterative hypothesis testing to arrive at the original message. Bit likelihoods are derived from symbol likelihoods, which are typically determined by the Euclidian distance a symbol is from the closest nominal symbol value. Symbol values are, in turn, derived from some form of digital modulation of an analog signal. An analog front end of a signal receiving circuit, aware of the noise conditions of a channel during the reception of a symbol, could influence the likelihood of the symbol and, hence, the likelihood of its encoded bits. This additional information may be used by the decoder to arrive at the original message faster or more reliably.

The encoded data may include intrinsic and extrinsic information. Intrinsic information, such as the Log Likelihood Ratio (LLR), is the soft information inherent in a bit U received over a channel. It is typically the sample a priori value prior to unconstrained decoding. Intrinsic information is given by the following: $\lambda_I(U) = \log_2 \{\text{prob}(U=1)\} - \log_2 \{\text{Prob}(U=0)\}$.

Extrinsic information is the information provide about a received bits from the other received bits given the code constraints, as in the following: $\lambda e(U) = \log 2 \{(\text{prob}(U=1|\text{decoding state})\} + \log 2 \{\text{Prob}(U=0)\} - \log 2 \{\text{Prob}(U=0|\text{decoding state})\} - \log 2 \{\text{prob}(U=1)\}$.

The channel density function estimation circuit 202 may provide an estimation of an aspect of the communications signal 18. The channel density function estimation circuit 202 may have a similar structure to the circuit 10 or the circuit 100 and may function in a similar way.

The noise detector 204 generally adds information to the signal from the channel density function estimation circuit 202 to assist in decoding the signal. The noise detector 204 may include analog electronic circuits, digital electronic circuits, or combinations of both. The noise detector 204 may determine or calculate an estimate of a density function, such as the PDF or the CDF, of the signal from the channel density function estimation circuit 202. The noise detector 204 may then map the density function to one or more density function bit samples and assign a density function bit reliability measure to each of the density function bit samples.

In some embodiments, the noise detector 204 may map the density function to a specific channel or noise source condition based on one or more attributes. The noise detector 204 may also introduce a bias component into the intrinsic or extrinsic information. This bias, or reality bias, can be imposed on the U=1 bit or the U=0 bit when, for example, tail information or median indicates a temporary bias, as in the following: $\lambda_I(U) = \log_2 \{\text{prob}(U=1) + \text{bias}\} - \log 2 \{\text{Prob}(U=0)\}$. Or, alternatively: $\lambda_I(U) = \log_2 \{\text{prob}(U=1) + \text{bias}\} - \log_2 \{\text{Prob}(U=0) + \text{bias}\}$.

In some embodiments, the noise detector 204 may determine or calculate an estimate of a density function, such as the PDF or the CDF, of the signal from the channel density function estimation circuit 202. The noise detector 204 may then map the density function to a specific channel or noise source condition based on one or more attributes. The noise detector 204 may also generate a bit stream V. The conditional probability of the soft bit P(U=1|V) and P(U=0|V) estimated. The extrinsic information is then computed using the U bits as well as the V bits, as in the following: $\lambda_e(U) = \log 2 \{(\text{prob}(U=1|\text{decoding state, V})\} + \log 2 \{\text{Prob}(U=0)\} - \log 2 \{\text{Prob}(U=0|\text{decoding state, V})\} - \log 2 \{\text{prob}(U=1)\}$.

The decoder 206 generally decodes the signal from the noise detector 204 and may include analog electronic circuits, digital electronic circuits, discrete logic components, or combinations thereof. The decoder 206 may determine the logic states of the appended density function bit and detected bits of the communications signal 18. The decoder 206 may also apply the appended density function bit reliability measures of the detected bits in order to generate the data bits.

Figure 6:
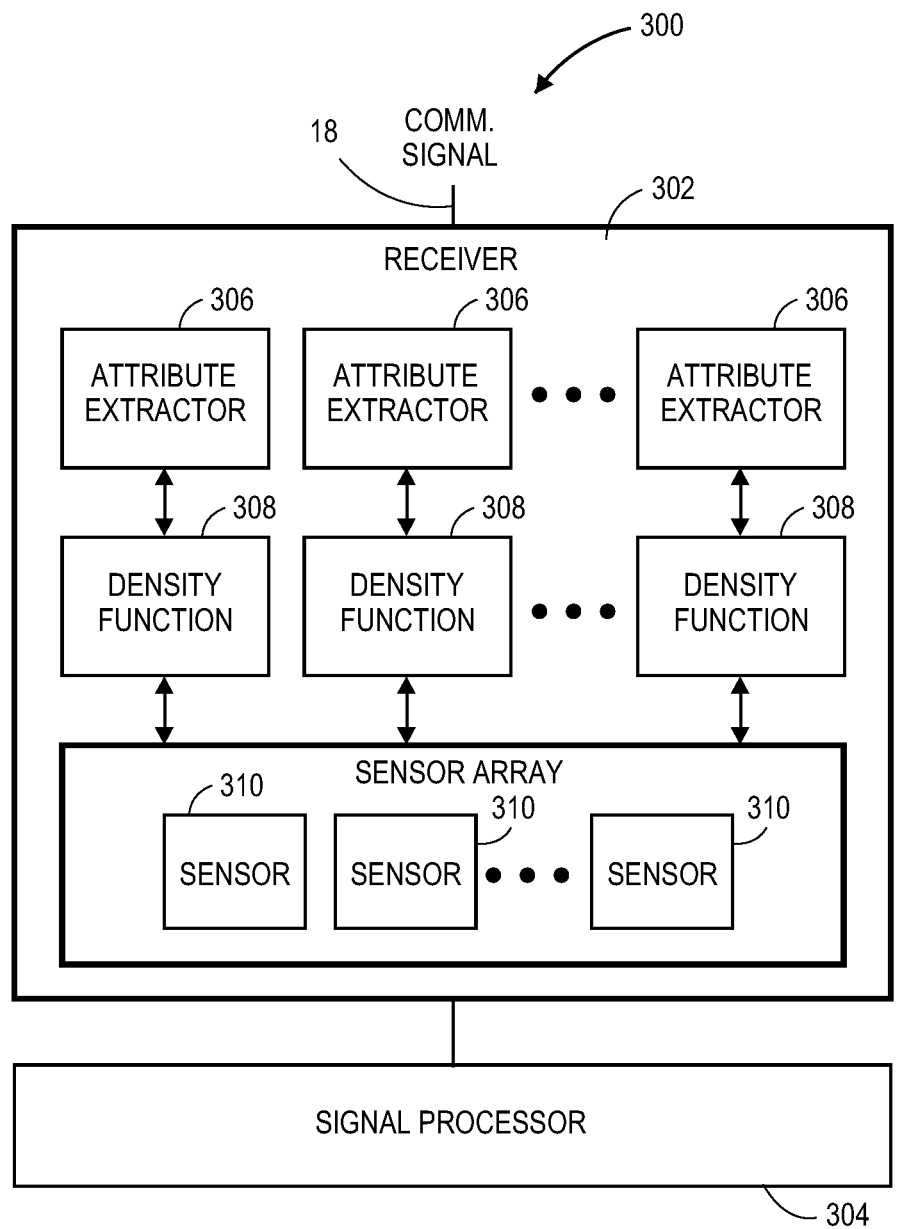
FIG. 6 is a schematic block diagram of an apparatus for classifying a communications signal, constructed in accordance with a fourth embodiment of the current invention.

An apparatus 300 for classifying a communications signal 18, constructed in accordance with a fourth embodiment of the current invention, is shown in FIG. 6, and may broadly comprise a receiver 302, and a signal processor 304. The apparatus 300 may be used in a communications system wherein noise is present—specifically noise that varies with time or the type or status of the communications equipment being used. The communications system may utilize a symbol-based encoding or modulation scheme and may include a channel, such as a data storage channel with a memory storage device. The apparatus 300 may classify the communications signal 18 as including noise and a predetermined type of event, such as a plurality of symbols being subjected to predetermined channel noise regimes, with each regime being represented by one or more of a plurality of temporal, or time-based, attributes.

The receiver 302 generally receives the communications signal 18 and performs initial processing on it. The receiver 302 may include a plurality of attribute extractors 306, a plurality of density function elements 308, and a plurality of sensors 310. The attribute extractors 306 and the density function elements 308 function in combination to calculate or determine an estimate of a density function, such as a PDF or a CDF, of the communications signal 18, and may extract attributes such as an average level or peak level of the signal. The attribute extractors 306 and the density function elements 308 may each include digital electronic circuits, analog active and/or passive electronic circuitry, such as operational amplifiers, filters, transistors, discrete components, and the like, or combinations thereof. In some embodiments, the attribute extractors 306 and the density function elements 308 may further include the circuit 10, the circuit 100, or combinations thereof.

The sensors 310 generally sense the communications signal 18 at different points as represented on a plot of the density function. The sensors 310 may include analog active and/or passive electronic circuitry, such as operational amplifiers, filters, transistors, discrete components, and the like, or combinations thereof. The sensors 310 may further sense or sample the density function at a plurality of different frequencies.

The signal processor 304 generally processes the signal from the receiver 302 in order to classify the signal. The signal processor 304 may include processors, microprocessors, microcontrollers, DSPs, FPGAs, analog and/or digital ASICs, or the like, or combinations thereof. The signal processor 14 may generally execute, process, or run instructions, code, code segments, software, firmware, programs, applications, apps, processes, services, daemons, or the like, or may step through states of a finite-state machine. In some embodiments, the signal processor 304 may be or may include the signal processor 14.

The signal processor 304 may be configured or programmed to determine a minimum number and a maximum number of channel noise regimes to which the communications signal 18 is subjected by utilizing a clustering technique. The clustering technique may include a method of moments, hierarchical clustering, centroid-based clustering (k-means), distribution-based clustering, density based clustering, Morphological Granulometry Density (GSD), Scaled Invariant Feature Transform (SIFT), or the like. The clusters may be initialized corresponding to the sampled points of the density function from the receiver 302, based on the minimum and maximum numbers of channel noise regimes. A signal value which corresponds to each of the channel noise regimes may be processed by updating parameters such as, but not limited to, the power level, harmonic decomposition, ratio of harmonics, frequency response, or the like, that are maintained for a cluster or group of clusters. A plurality of statistical values, such as, but not limited to, the mean, the standard deviation, percentiles, or the maximum deviation, are calculated from the updated parameters. The signal from the receiver 302 may be classified based on the statistical values and the updated parameters.

In other embodiments, clusterization or classification of the communications signal 18 based a density function can be used to determine the channel status for memory channels. This is especially important for channels that exhibit cyclostationarity such as power grid systems. A channel having statistical properties that vary cyclically with time is called a cyclostationary process. Typically, noise spikes generated by a equipment connected to powerline can be considered a temporary change in channel status. The memory channel can be modeled with a finite state Markov chain. The two-state (G for good and B for burst) Markov model is referred to as the Gilbert-Elliott model. In addition, noise generated by the cyclostationary sources may be modeled as a memory channel. Furthermore, state characterization of the data may be performed using clustering techniques of samples of the density functions over one or more finite time periods.

When utilizing the density functions, the number and location of PDF sample points (or equivalently quantiles of the CDF) is an important element. The PDF may be considered a waveform with a frequency spectrum. This spectrum may be estimated through Fourier transform of the PDF or the Fourier transform of the PDF repeated with a period T. The waveform may be sampled, according to the Nyquist theorem, at twice the maximum bandwidth to have enough points to exactly reconstruct the signal. Thus, the informational content (entropy) of this sampling is optimal. This can yield an oversampling of the density functions for a specific application. In some embodiments, clusterization can also be used to find out which samplings points are the most appropriate to do the characterization of the PDF. The density function of the PDF may be used to find the right sampling points.

Figure 7:
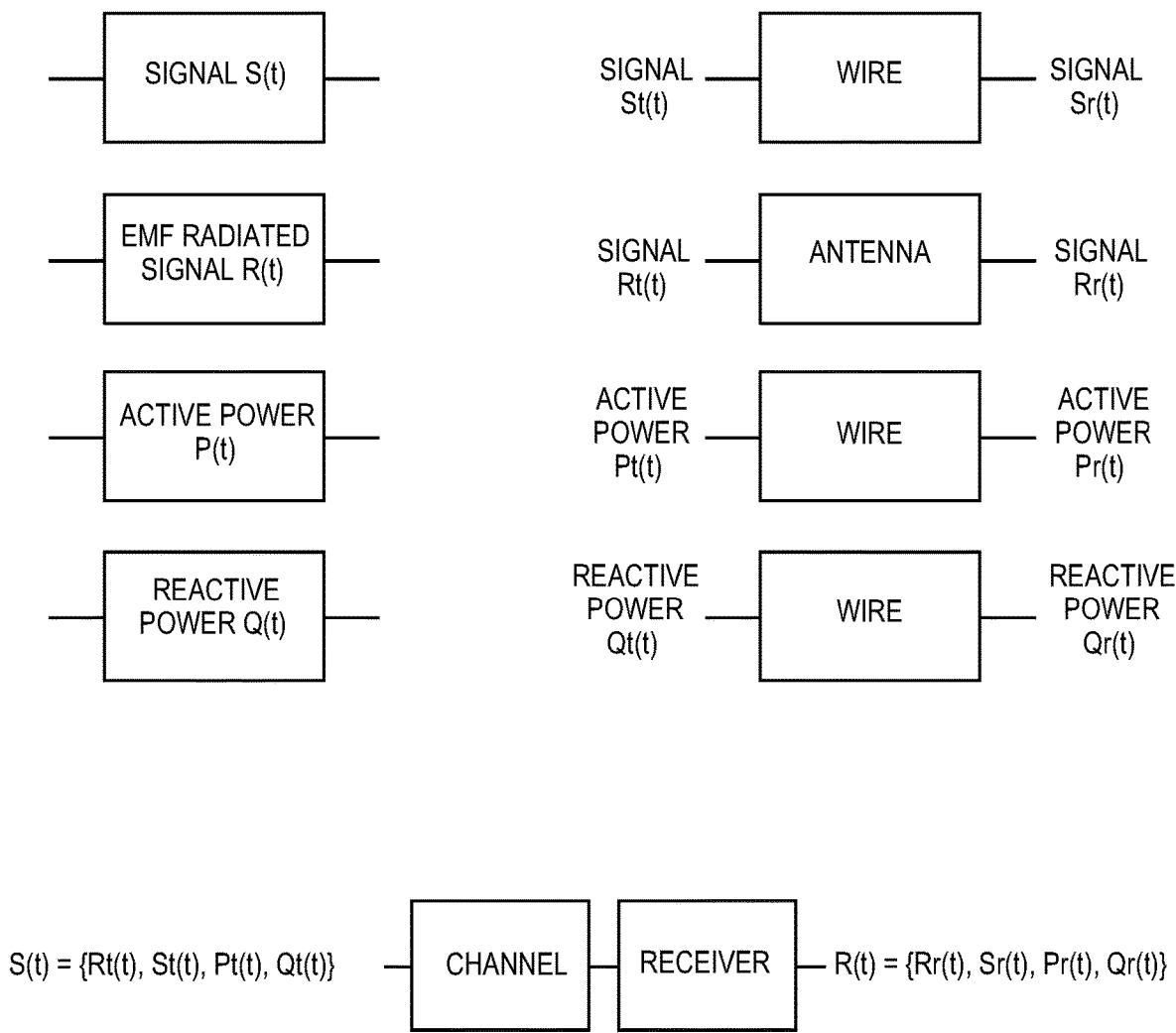
FIG. 7 is a schematic block diagram of a system in which embodiments of the current invention may be utilized.
Figure 8:
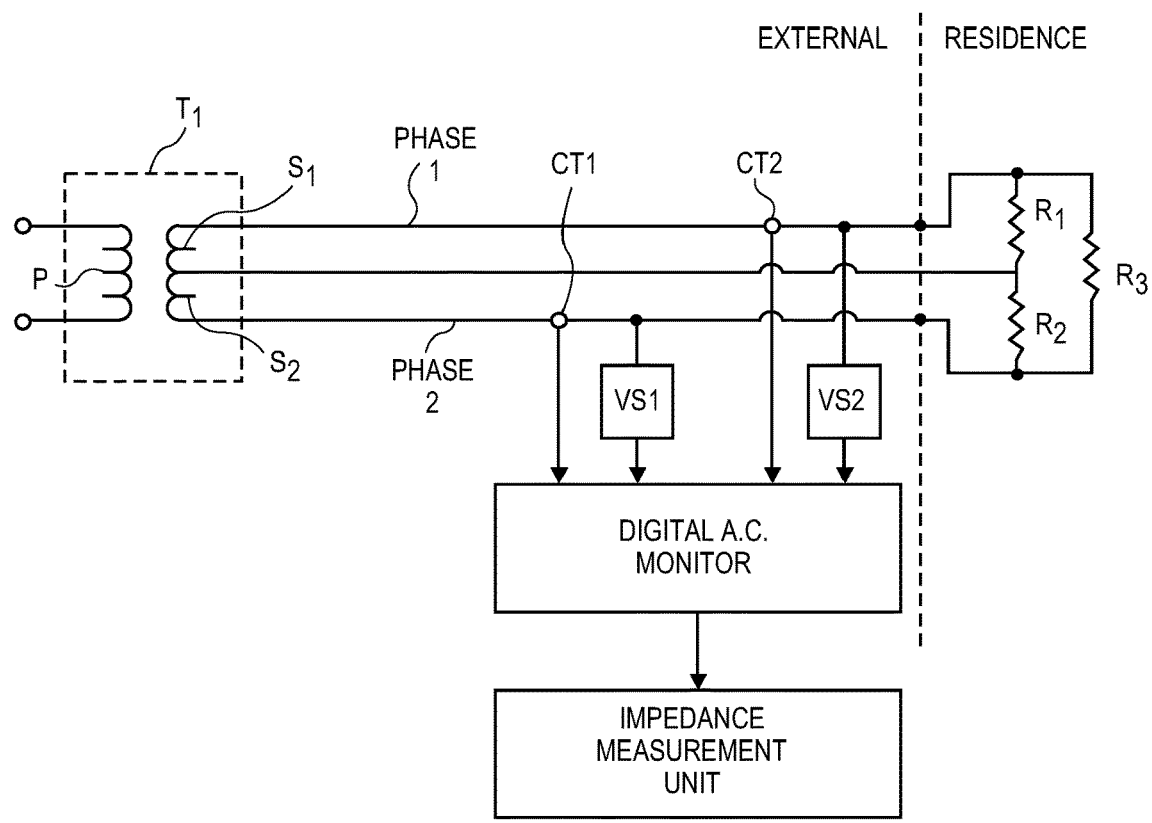
FIG. 8 is a schematic block diagram of a system in which embodiments of the current invention may be utilized.
Figure 9:
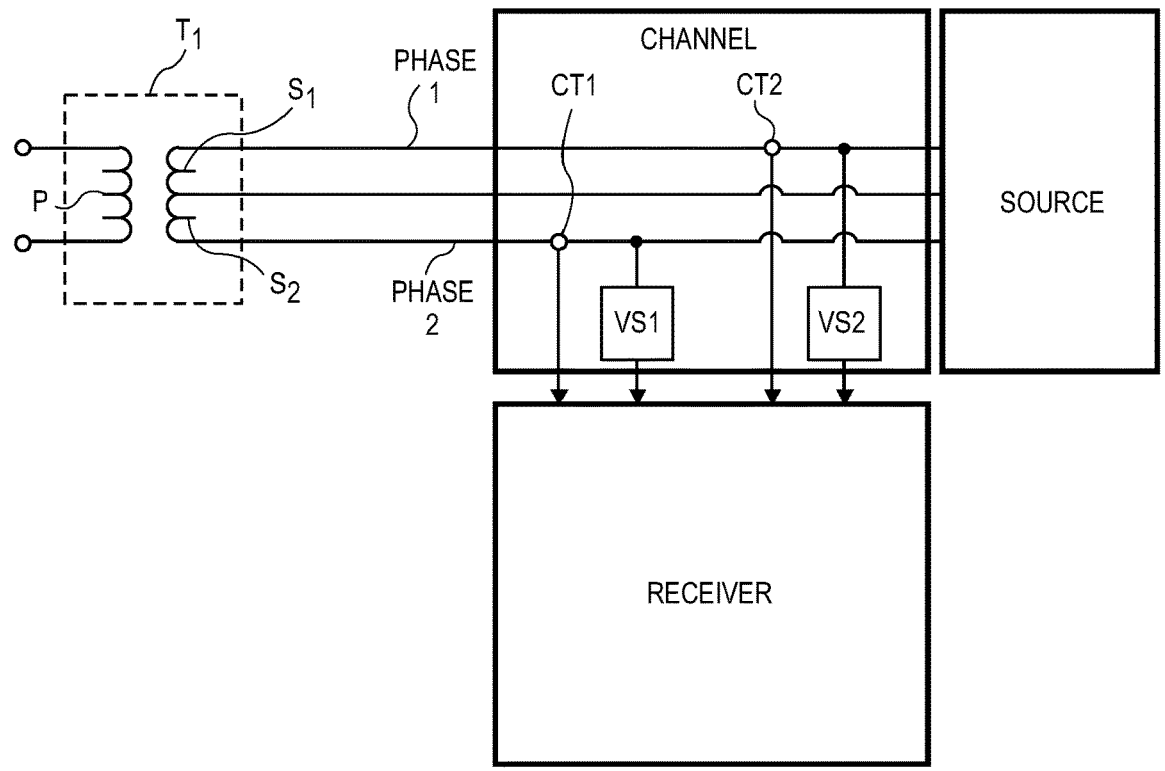
FIG. 9 is a schematic block diagram of a system in which embodiments of the current invention may be utilized.

In certain embodiments, density function centric signal processing can also be used with vectorial signals, matrixed signals, or signals that have more than one dimension. One embodiment applies density function estimation to processing of signals on power lines in conjunction with power measurements. These signals are carried by a combined signal and power channel. One component is the active Power P(t), another component the reactive power Q(t), the third component the signal level carried over the metal wire S(t). Examples of these types of systems are shown in FIGS. 7-9.

Another embodiment expands density function estimation to processing of signals on power lines in conjunction with power and radiated electromagnetic interference (EMI). These signals are carried by a combined signal, power, and wireless channel. A first component is the active Power P(t). A second component is the reactive power Q(t). A third component is the signal level carried over the metal wire S(t). A fourth component is the high frequency radiated power R(t). Examples of these types of systems may also be shown in FIGS. 7-9. For the preceding embodiments, the active and reactive powers are considered as signals. These signals can be transformed for the purpose of signal processing, including the power law.

Another embodiment implements a density function equalization to ensure that the noise processed by the receiver is Gaussian, thus enabling traditional receiver subsystems to remain unchanged. This is accomplished by estimating the density function of the entire signal, removing a baseline value for the expected signals, then applying an homomorphic transformation to the signal that the resulting signal has a noise with a Gaussian distribution.

Figure 10:
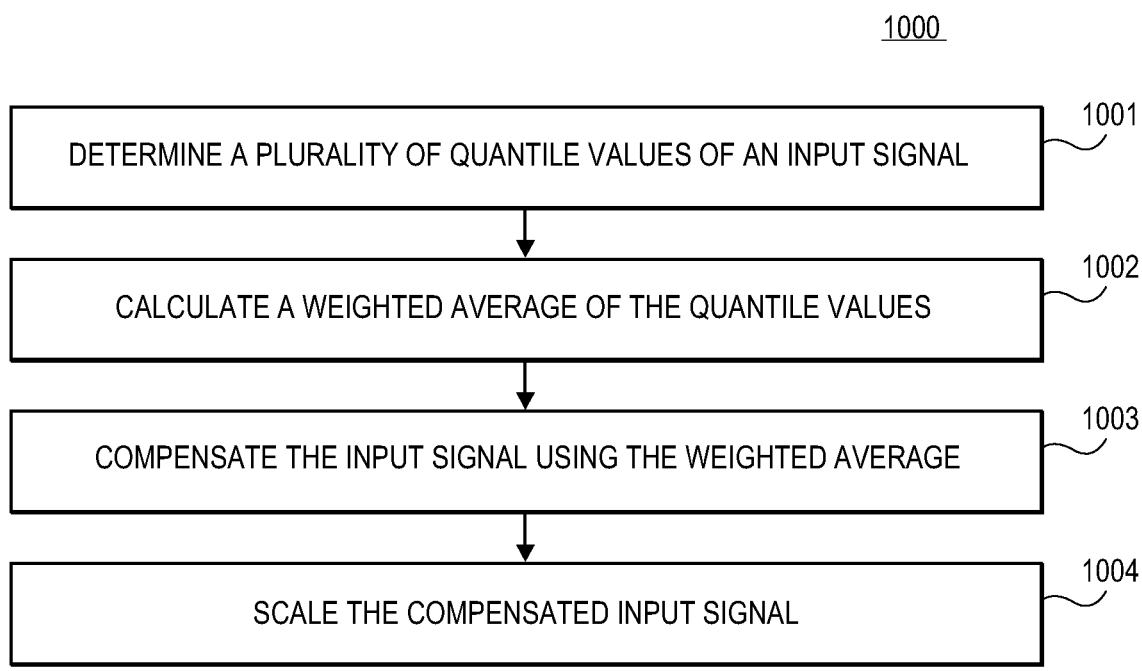
FIG. 10 is a flow diagram of at least a portion of the steps of a method of DC offset estimation in accordance with a fifth embodiment of the current invention.

At least a portion of the steps of a method 1000, in accordance with a fifth embodiment of the current invention, of DC offset estimation is shown in FIG. 10. The steps of the method 1000 may be performed in the order as shown in FIG. 10, or they may be performed in a different order. Furthermore, some steps may be performed concurrently as opposed to sequentially. In addition, some steps may not be performed.

Referring to step 1001, a plurality of quantile values 16 of an input signal is determined. The input signal may be a communications signal 18 that is received by a circuit 100 for fine DC offset estimation. The quantile value 16 is a value of a certain attribute of the signal such as the voltage, the current, the power, or the like. The probability that the value of the attribute of the signal is less than the quantile value 16 is inversely proportional to the number n of quantile values 16, as seen in FIG. 3. The circuit 100 may include a DC offset estimator 104 with a quantile value circuit 12 which determines or calculates the quantile values 16 as described above.

Referring to step 1002, a weighted average of the quantile values 16 is calculated. The DC offset estimator 104 of circuit 100 may also include a signal processor 14 which is configured to calculate or determine the weighted average of the quantile values 16.

Referring to step 1003, the communications signal 18 is compensated using the weight average. The signal processor 14 may be configured to apply a weighted average compensation to the communications signal 18.

Referring to step 1004, the compensated communications signal 18 is scaled. The circuit 100 may further include the adaptive prescaler 106 which may reduce the frequency of the communications signal 18 by an integer factor.

Figure 11:
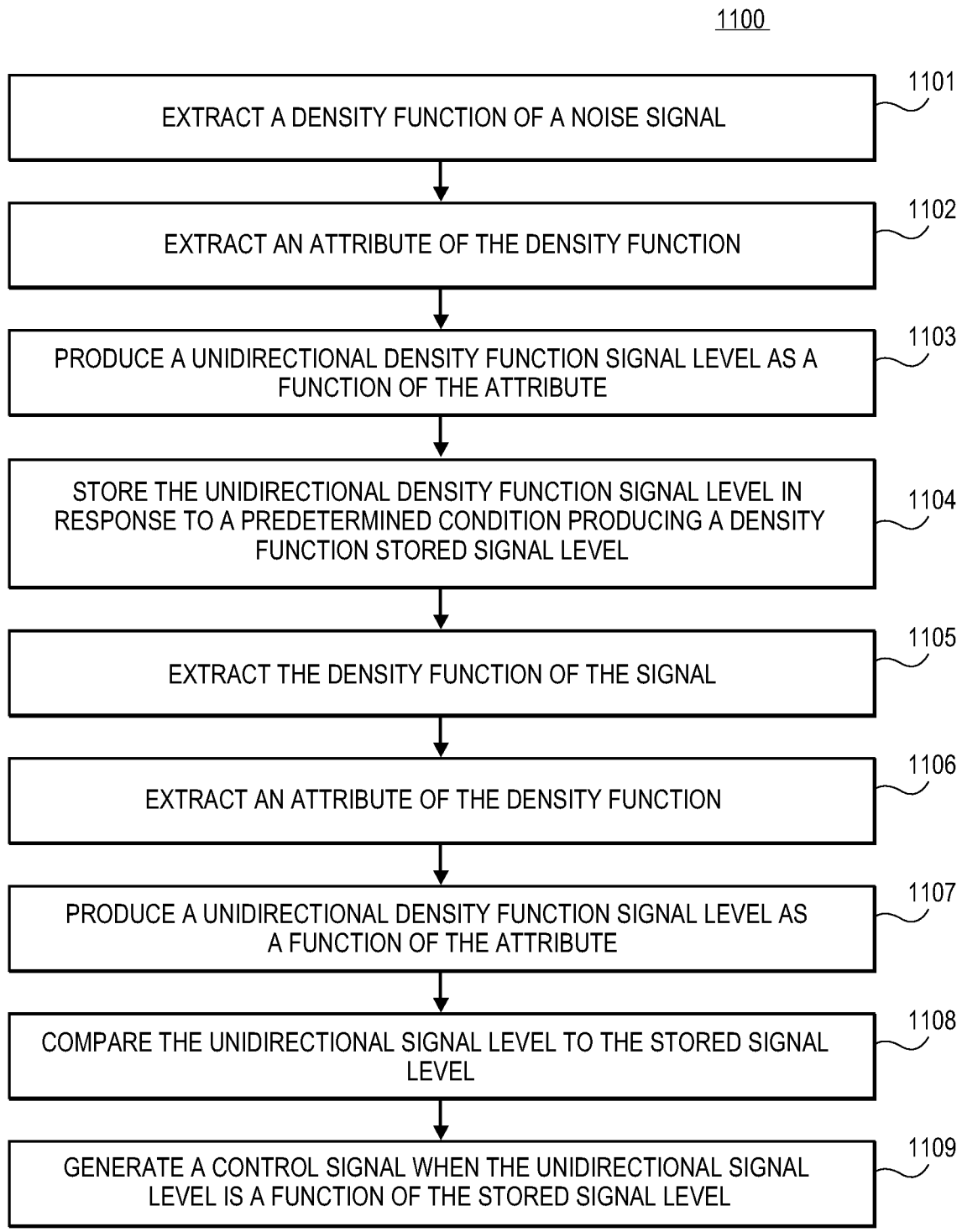
FIG. 11 is a flow diagram of at least a portion of the steps of a method of processing a noise signal with functions including automatic squelch, automatic gain control (AGC), and dynamic range control (DRC) in accordance with a sixth embodiment of the current invention.

At least a portion of the steps of a method 1100, in accordance with a sixth embodiment of the current invention, of processing a noise signal with functions including automatic squelch, automatic gain control (AGC), equalization, and dynamic range control (DRC) is shown in FIG. 11. The steps of the method 1100 may be performed in the order as shown in FIG. 11, or they may be performed in a different order. Furthermore, some steps may be performed concurrently as opposed to sequentially. In addition, some steps may not be performed.

Referring to steps 1101 and 1102, a density function of a noise signal is extracted, and an attribute of the density function is extracted. The apparatus 300 may include the receiver 302 with a plurality of attribute extractors 306 and density function elements 308. The noise signal may be received from an external noise detector or the noise detector 204 and may be coupled to the apparatus 300 so that the density function elements 308 produce a density function and the attribute extractors 306 extract various attributes from the density function waveform. The attributes may correspond to average, quantile, or peak levels of the noise signal. The receiver 302 may further include a plurality of sensors 310 that sample the density function waveform at different points on the waveform and at different frequencies.

Referring to step 1103, a unidirectional density function signal level as a function of the attribute is produced. The density function signal level is generally related to the density function and may include quantile levels, peak levels, average levels, or the like.

Referring to step 1104, the unidirectional density function signal level is stored. The apparatus 300 may further include a memory storage element such as random-access memory, sample and hold circuits, flip-flops, or the like, or combinations thereof.

Referring to steps 1105, 1106, and 1107, a density function of the noise signal is extracted, an attribute of the density function is extracted, and a unidirectional density function signal level as a function of the attribute is produced. These steps are performed after the unidirectional density function signal level is stored. In addition, these steps may be performed in a continuous and/or real-time fashion as the noise signal is repeatedly sampled.

Referring to step 1108, the most recently produced unidirectional density function signal level is compared to the stored unidirectional density function signal level. The apparatus 300 may include the signal processor 304 which may retrieve the stored unidirectional density function signal level from the memory storage element and may compare the two levels.

Referring to step 1109, a control signal is generated when the most recently produced unidirectional density function signal level is a function of the stored unidirectional density function signal level. As an example, the signal processor 304 may generate a squelch signal if the most recently produced unidirectional density function signal level is greater than the stored unidirectional density function signal level. Alternatively, the signal processor 304 may generate a signal to attenuate or amplify a secondary signal such as an audio signal, a video signal, a communications signal, or the like. Alternatively, the signal processor 304 may amplify a frequency sub-band of a signal.

At least a portion of the steps of a method 1200, in accordance with a seventh embodiment of the current invention, of decoding a signal received from a channel is shown in FIG. 12. The steps of the method 1200 may be performed in the order as shown in FIG. 12, or they may be performed in a different order. Furthermore, some steps may be performed concurrently as opposed to sequentially. In addition, some steps may not be performed.

Referring to step 1201, a density function of a received signal is determined. The signal from the channel may be received by the decoder apparatus 200 which includes a noise detector 204 that determines or estimates a density function of a signal.

Referring to steps 1202 and 1203, a bias attribute based on the density function is determined and a reliability bias based on the bias attribute is determined. the noise detector 204 may map the density function to a specific channel or noise source condition based on one or more attributes. The noise detector 204 may also introduce a bias component into the intrinsic or extrinsic information.

Referring to steps 1204 and 1205, the reliability bias is applied to a reliability measure to estimate logic states of detected bits in the signal, and data bits are generated as a function of the detected bits. The decoder apparatus 200 may further include a decoder 206, which may determine the logic states of the appended density function bit and detected bits of the communications signal 18. The decoder 206 may also apply the appended density function bit reliability measures of the detected bits in order to generate the data bits.

At least a portion of the steps of a method 1300, in accordance with a eighth embodiment of the current invention, of classifying a signal as one of noise and a predetermined type of event comprising a plurality of symbols subjected to predetermined channel noise regimes, each regime represented by one or more of a plurality of temporal attributes is shown in FIG. 13. The steps of the method 1300 may be performed in the order as shown in FIG. 13, or they may be performed in a different order. Furthermore, some steps may be performed concurrently as opposed to sequentially. In addition, some steps may not be performed.

Referring to step 1301, a density function of a signal is estimated. The signal may be a communications signal 18 that is received by the apparatus 300 which includes a receiver 302 with a plurality of density function elements 308. Each density function element 308 may calculate or determine an estimate of a density function.

Referring to step 1302, the density function is sampled at a plurality of points. The receiver 302 of the apparatus 300 may include a plurality of sensors 310 which sense the communications signal 18 at different points as represented on a plot of the density function. The sensors 310 may further sense or sample the density function at a plurality of different frequencies.

Referring to step 1303, a maximum number of the regimes and a minimum number of the regimes are determined through a clustering technique. The apparatus 300 may further include a signal processor 304 that is configured to determine the maximum and minimum number of channel noise regimes to which the communications signal 18 is subjected. The signal processor 304 is further configured to utilize any one of a plurality of clustering techniques including a method of moments, hierarchical clustering, centroid-based clustering (k-means), distribution-based clustering, density based clustering, Morphological Granulometry Density (GSD), Scaled Invariant Feature Transform (SIFT), or the like.

Referring to step 1304, a plurality of clusters corresponding to the sampled points is initialized based upon the maximum and minimum numbers. The signal processor 304 may further be configured to initialize the clusters corresponding to the sampled points of the density function from the receiver 302, based on the minimum and maximum numbers of channel noise regimes.

Referring to step 1305, a signal value corresponding to each of the regimes is processed by updating parameters maintained for a cluster. The signal processor 304 may further be configured to process, through a clustering technique, a signal value corresponding to each of the regimes by updating parameters maintained for a cluster. The parameters may include the power level, harmonic decomposition, ratio of harmonics, and frequency response or the like.

Referring to step 1306, a plurality of statistical values from the parameters maintained for the clusters is calculated. The signal processor 304 may further be configured to calculate the statistical values, such as the mean, the standard deviation, percentiles, or the maximum deviation, from the parameters maintained for the clusters.

Referring to step 1307, the signal based upon the plurality of statistical values and the parameters is classified. The signal processor 304 may further be configured to classify the signal based upon the plurality of statistical values and the parameters.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A decoder apparatus for receiving a signal from a channel medium, the decoder apparatus comprising:
   a noise detector adapted to receive a signal from a channel density function estimation circuit, wherein the noise detector estimates a signal density function, maps the signal density function to one or more density function bit samples, and appends a density function bit reliability measure to each bit sample; and
   a decoder that determines logic states of the appended density function bit reliability measures and detected bits in the signal and applies the density function bit reliability measures of detected bits to generate data bits.

2. The decoder apparatus of claim 1, wherein the signal density function includes a probability density function or a cumulative distribution function.

3. The decoder apparatus of claim 1, wherein the noise detector introduces a bias attribute.

4. The decoder apparatus of claim 3, wherein the noise detector maps the signal density function to a specific channel or noise source condition based on one or more attributes.

5. The decoder apparatus of claim 3, wherein the noise detector introduces the bias attribute when tail information indicates a temporary bias.

6. The decoder apparatus of claim 3, wherein the noise detector introduces the bias attribute when a median indicates a temporary bias.

7. The decoder apparatus of claim 3, wherein the noise detector introduces the bias attribute to intrinsic information associated with a bit.

8. The decoder apparatus of claim 3, wherein the noise detector introduces the bias attribute to extrinsic information associated with a bit.

9. A method of decoding a signal received from a channel, the method comprising the steps of:
   determining a density function of a received signal;
   determining a bias attribute based on the density function of the signal;
   determining a reliability bias for the bias attribute;
   applying the reliability bias to a reliability measure to estimate logic states of detected bits in the signal; and
   generating user bits as a function of the detected bits.

10. The method of claim 9, wherein the density function includes a probability density function or a cumulative distribution function.

11. The method of claim 9, wherein applying the reliability bias to a reliability measure to estimate logic states of detected bits in the signal comprises:
   introducing the bias attribute when tail information indicates a temporary bias.

12. The method of claim 9, wherein applying the reliability bias to a reliability measure to estimate logic states of detected bits in the signal comprises:
   introducing the bias attribute when a median indicates a temporary bias.

13. The method of claim 9, wherein applying the reliability bias to a reliability measure to estimate logic states of detected bits in the signal comprises:
   introducing the bias attribute to intrinsic information associated with a bit.

14. The method of claim 9, wherein applying the reliability bias to a reliability measure to estimate logic states of detected bits in the signal comprises:
   introducing the bias attribute to extrinsic information associated with a bit.

* * * * *